United States Patent
Adam et al.

(10) Patent No.: US 10,047,653 B2
(45) Date of Patent: Aug. 14, 2018

(54) REGENERATION METHOD FOR EXHAUST-GAS AFTERTREATMENT SYSTEMS

(71) Applicant: UMICORE AG & CO. KG, Hanau-Wolfgang (DE)

(72) Inventors: Frank Adam, Linsengericht (DE); Sebastian Mueller, Maintal (DE); David Palm, Limeshain (DE); Susanne Kunert, Seeheim-Jugenheim (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 19 days.

(21) Appl. No.: 15/301,016

(22) PCT Filed: Mar. 24, 2015

(86) PCT No.: PCT/EP2015/056170
§ 371 (c)(1),
(2) Date: Sep. 30, 2016

(87) PCT Pub. No.: WO2015/150153
PCT Pub. Date: Oct. 8, 2015

(65) Prior Publication Data
US 2017/0016368 A1    Jan. 19, 2017

(30) Foreign Application Priority Data

Apr. 3, 2014    (DE) .................. 10 2014 206 455

(51) Int. Cl.
*F01N 3/00*    (2006.01)
*F01N 3/02*    (2006.01)
(Continued)

(52) U.S. Cl.
CPC ......... *F01N 3/0885* (2013.01); *F01N 3/0814* (2013.01); *F01N 3/0842* (2013.01);
(Continued)

(58) Field of Classification Search
CPC .. F01N 11/007; F01N 13/0093; F01N 3/0814; F01N 3/0842; F01N 3/0871;
(Continued)

(56) References Cited

U.S. PATENT DOCUMENTS 6,182,445 B1 *  2/2001  Yamazaki ............. F01N 3/0814
                                                      137/551
6,387,338 B1    5/2002  Anatoly et al.
(Continued)

FOREIGN PATENT DOCUMENTS

DE        19918756 A1   10/2000
DE     102013218234 A1    3/2005
(Continued)

OTHER PUBLICATIONS

Hagelüken. Autoabgaskatalysatoren, Grundlagen—Herstellung—Entwicklung—Recycling—Ökologie [Exhaust Gas Catalysts for Vehicles, Foundations—Manufacture—Development—Recycling—Ecology], 2nd Edition, 2005, p. 49.
(Continued)

*Primary Examiner* — Patrick Maines
*Assistant Examiner* — Dapinder Singh
(74) *Attorney, Agent, or Firm* — Smith, Gambrell & Russell, LLP

(57) ABSTRACT

The present invention relates to a method for regenerating exhaust-gas aftertreatment systems capable of storing nitrogen oxides in lean exhaust gas, and in rich exhaust gas of reducing nitrogen oxides to nitrogen. The invention is used in exhaust-gas aftertreatment systems which consist of at least one NOx storage catalyst arranged near the engine and at least one NOx storage catalyst located in the underbody of the vehicle and are intended to clean the exhaust gas of spark-ignition engines predominantly run on a lean mixture.

5 Claims, 3 Drawing Sheets

Figure 1:
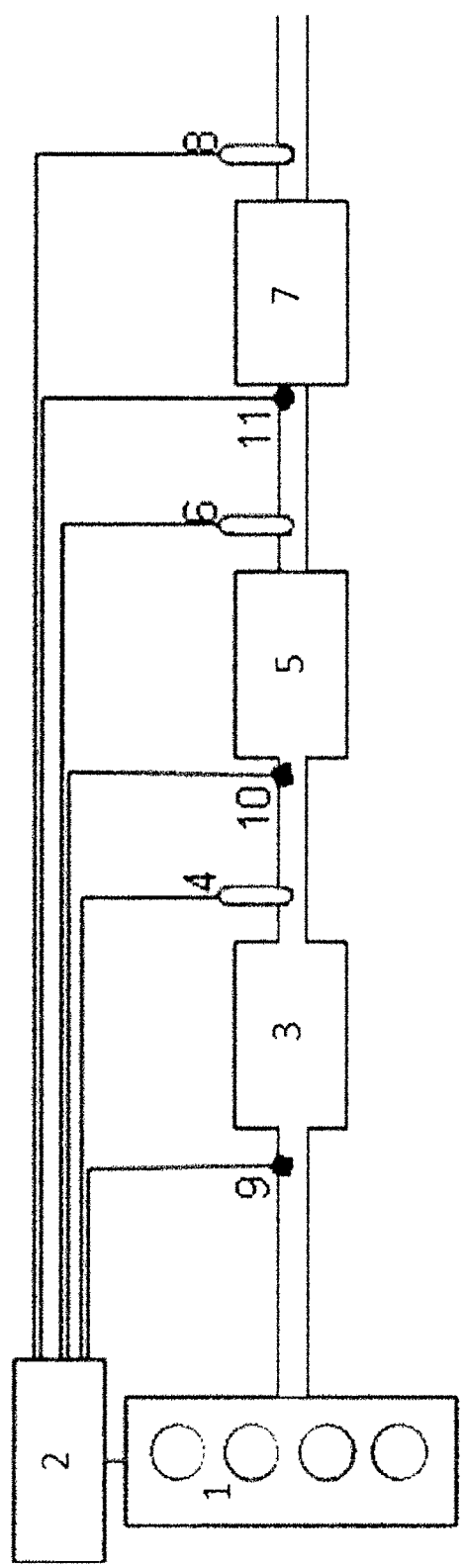

(51) Int. Cl.
*F01N 3/10* (2006.01)
*F01N 3/20* (2006.01)
*F01N 3/08* (2006.01)
*F01N 9/00* (2006.01)
*F01N 13/00* (2010.01)
*F01N 11/00* (2006.01)

(52) U.S. Cl.
CPC .......... *F01N 3/0871* (2013.01); *F01N 3/101* (2013.01); *F01N 9/00* (2013.01); *F01N 11/007* (2013.01); *F01N 13/0093* (2014.06); *F01N 2340/02* (2013.01); *F01N 2550/02* (2013.01); *F01N 2900/1602* (2013.01); *F01N 2900/1614* (2013.01); *Y02T 10/22* (2013.01); *Y02T 10/47* (2013.01)

(58) Field of Classification Search
CPC .......... F01N 3/0885; F01N 3/101; F01N 9/00; F01N 2340/02; F01N 2550/02; F01N 2900/1602; F01N 2900/1614; Y02T 10/22; Y02T 10/47
USPC .................. 60/286, 295, 299–301
See application file for complete search history.

(56) References Cited

U.S. PATENT DOCUMENTS

| | | |
|---|---|---|
| 6,468,941 B1 | 10/2002 | Bortun et al. |
| 6,602,820 B1 | 8/2003 | Goebel et al. |
| 6,605,264 B2 | 8/2003 | Bortun et al. |
| 6,875,725 B2 | 4/2005 | Lindner et al. |
| 7,041,622 B2 | 5/2006 | Nunan |
| 8,640,440 B2 | 2/2014 | Klingmann et al. |
| 8,663,588 B2 | 3/2014 | Lindner et al. |
| 9,328,682 B2 | 5/2016 | Hoyer et al. |
| 2007/0271908 A1* | 11/2007 | Hemingway ......... F01N 3/0814 60/286 |
| 2009/0229249 A1 | 9/2009 | Bremm et al. |
| 2010/0135879 A1 | 6/2010 | Roesch et al. |
| 2010/0233051 A1 | 9/2010 | Grisstede et al. |
| 2011/0192143 A1* | 8/2011 | Andersson ............ F01N 3/021 60/274 |
| 2012/0148464 A1 | 6/2012 | Eckhoff et al. |
| 2013/0028818 A1 | 1/2013 | Eckhoff et al. |
| 2016/0222901 A1 | 8/2016 | Adam et al. |

FOREIGN PATENT DOCUMENTS

| | | |
|---|---|---|
| DE | 102009039249.1 | 8/2009 |
| DE | 102010014468 A1 | 10/2011 |
| EP | 0982066 A1 | 3/2000 |
| EP | 1101528 A2 | 5/2001 |
| EP | 1181970 A1 | 2/2002 |
| EP | 1317953 A1 | 6/2003 |
| EP | 1536111 B1 | 8/2006 |
| EP | 1911506 A1 | 4/2008 |
| EP | 1309775 B1 | 6/2008 |
| EP | 1663458 B1 | 1/2009 |
| EP | 2042225 A1 | 4/2009 |
| JP | 2009150282 A | 7/2009 |
| WO | 2005/092481 A1 | 6/2005 |
| WO | 2005/113126 A1 | 12/2005 |
| WO | 2006/069652 A1 | 7/2006 |
| WO | 2008/000449 A2 | 1/2008 |
| WO | 2008/113445 A1 | 9/2008 |
| WO | 2010/034452 A1 | 4/2010 |

OTHER PUBLICATIONS

Heck et al., Automotive Catalyst. Catalytic Air Pollution Control: Commercial Technology, 1995, pp. 73-112.

Miyoshi et al. Development of New Concept Thee-Way Catalyst for Automotive Lean-Burn Engines. SAE Technical Paper Series. SAE950809. 1995 pp. 121-130.

Federal Register; vol. 75, No. 88, 2010 / Rules and Regulations, p. 25399.

Federal Register; vol. 77, No. 199, 2012 / Rules and Regulations, p. 62799.

Ball et al. $N_2O$ Emissions of Low Emission Vehicles. SAE International. 2013 SAE 2013-01-1300. 7 pages.

Parks et al. Nitrogen Selectivity in Lean NOx Trap Catalysis with Diesel Engine In-Cylinder Regeneration. SAE International Technical Paper Series. SAE 2005-01-3876. 15 pages.

Written Opinion of the International Searching Authority for International Application No. PCT/EP2015/056170 dated Oct. 12, 2015 (11 pages).

International Preliminary Report on Patentability for Internationl Application No. PCT/EP2015/0561701 dated Oct. 4, 2016 (13 pages).

International Search Report for PCT/EP2015/056170, dated Sep. 25, 2015 in English and German Language.

\* cited by examiner

REGENERATION METHOD FOR EXHAUST-GAS AFTERTREATMENT SYSTEMS

The present invention relates to a method for regenering exhaust-gas aftertreatment systems capable of storing nitrogen oxides in lean exhaust gas and reducing nitrogen oxides to nitrogen in rich exhaust gas. The invention is used in exhaust-gas aftertreatment systems that consist of at least one NOx storage catalyst arranged near the engine and at least one NOx storage catalyst located in the underbody of the vehicle and are intended to clean the exhaust gas of spark-ignition engines predominantly run on a lean mixture.

The exhaust gas of combustion engines in motor vehicles typically contains the harmful gases carbon monoxide (CO) and hydrocarbons (HC), nitrogen oxides ($NO_x$) and possibly sulfur oxides ($SO_x$), as well as particulates that mostly consist of soot residues and possibly adherent organic agglomerates. These are designated as primary emissions. CO, HC and particulates are the products of the incomplete combustion of the fuel inside the combustion chamber of the engine. Nitrogen oxides form in the cylinder from nitrogen and oxygen in the intake air when the combustion temperatures locally exceed 1400° C. Sulfur oxides result from the combustion of organic sulfur compounds, small amounts of which are always present in non-synthetic fuels. For the removal of these emissions that are harmful to health and environment from the exhaust gases of motor vehicles, a variety of catalytic technologies for the purification of exhaust gases have been developed, the fundamental principle of which is usually based upon guiding the exhaust gas that needs purification over a catalyst consisting of a flow-through or wall-flow honeycomb-like body and a catalytically active coating applied to it. The catalyst facilitates the chemical reaction of different exhaust gas components while forming non-hazardous products, such as carbon dioxide and water.

The mode of operation and the composition of the catalysts that are used differ significantly in part depending upon the composition of the exhaust gas to be purified and the exhaust gas temperature level that is to be expected at the catalyst. A multitude of compositions used as catalytically active coating in the catalyst contain components in which, under certain operating conditions, one or more exhaust gas components can be temporarily bound and intentionally released again when an appropriate change in operating conditions occurs. Components with such a capacity are generally referred to below as storage materials.

For example, oxygen-storing materials in three-way catalysts are used to remove CO, HC, and $NO_x$ from the exhaust gas of spark-ignition engines that are operated predominantly and on average with stoichiometric air/fuel mixtures. The best-known oxygen storage materials are mixed oxides of cerium and zirconium that may be doped with further oxides, in particular with rare earth metal oxides, such as lanthanum oxide, praseodymium oxide, neodymium oxide or yttrium oxide (Autoabgaskatalysatoren, Grundlagen—Herstellung—Entwicklung—Recycling—Ökologie, [Exhaust Gas Catalytic Converters for Vehicles, Foundations—Manufacture—Development—Recycling—Ecology] Christian Hagelüken, 2nd Edition, 2005, p. 49; Catalytic Air Pollution Control, Commercial Technology, R. Heck et al., 1995, p. 73-112).

Nitrogen oxide storage catalysts are used to remove nitrogen oxides contained in lean exhaust gas of what are known as lean-mix engines (diesel, Lean-GDI). The cleaning effect is therein based on the fact that the nitrogen oxides are stored by the storage material of the storage catalyst in the form of nitrates in a lean operating phase (storage phase, lean operation) of the engine. In a subsequent rich operating phase (regeneration phase, rich operation, DeNOx phase) of the engine, the previously formed nitrates are broken down and the nitrogen oxides that are released again are converted—with the reducing, rich components of the exhaust gas—into nitrogen, carbon dioxide and water at the storage catalyst during the rich operation. Among other things, hydrocarbons, carbon monoxide, ammonia and hydrogen are designated as rich components of the exhaust gas.

The operating principle of nitrogen oxide storage catalysts is described in detail in the SAE document SAE 950809. The composition of nitrogen oxide storage catalysts is sufficiently known to the person skilled in the art. The nitrogen oxide storage materials are usually basic compounds of alkali or alkaline earth metals—for example oxides, hydroxides or carbonates of barium and strontium—which are deposited in finely distributed form on suitable substrate materials. Furthermore, a nitrogen oxide storage catalyst also has catalytically active precious metals of the platinum group and oxygen storage materials. This composition gives a nitrogen oxide storage catalyst under stoichiometric operating conditions the functionality of a three-way catalyst (DE102009039249 and the literature cited therein).

The storage phase for nitrogen oxides (lean operation) usually lasts 100 to 2000 seconds and is dependent upon the storage capacity of the catalyst and the concentration of the nitrogen oxides in the exhaust gas. In the case of aged catalysts with reduced storage capacity, the duration of the storage phase can however also fall to 50 seconds or less. The regeneration phase (rich operation) is, in contrast, always significantly shorter and only lasts a few seconds (5 s-20 s). The exhaust gas escaping from the nitrogen oxide storage catalyst during regeneration fundamentally does no longer comprise any harmful substances and is composed approximately stoichiometrically. Its air ratio [lambda] (lambda: indicates the ratio of fuel to air in the exhaust gas—see below) is nearly equal to 1 during this time period. At the end of the regeneration phase, the released nitrogen oxides and the oxygen bound to the oxygen storage components of the catalyst are no longer sufficient to oxidize all rich exhaust gas components. This therefore leads to a breakthrough of these components through the catalyst, and the air ratio decreases to a value below 1. The exhaust gas breaking through possibly includes greater quantities of ammonia ($NH_3$) that is formed from the over-reduction of nitrogen oxides. This breakthrough indicates the end of the regeneration and may be registered with the aid of a so-called lambda probe after the storage catalyst (so-called sensor-controlled system).

In addition to the reduction of these primary emissions, more recent legislation governing exhaust gas emissions—in particular in the US (GHG Emission Standard; SULEV) not only mandates that these be drastically reduced but also requires maximum suppression of the formation of the secondary emissions generated by the exhaust gas components themselves, such as methane ($CH_4$) and the potent greenhouse gas nitrous oxide ($N_2O$) (Federal Register; Vol. 75, No. 88, 2010/Rules and Regulations, Page 25399; Federal Register; Vol. 77, No. 199, 2012/Rules and Regulations, Page 62799; http://epa.gov/climatechange/ghgemissions/gases/n2o.html). Such guidelines for the discharge of the secondary emissions $NH_3$, $CH_4$, and $N_2O$ are also currently under discussion in the European Union and are possibly to be integrated in EU6, which comes into force in 2014, but will in any event be integrated into a subsequent legislation.

As stated, nitrous oxide is a strong greenhouse gas. In the US, a limit value of 0.01 g/mile is already being discussed for $N_2O$ emissions. This value is difficult to achieve with previous exhaust gas aftertreatment concepts using NOx storage catalysts (SAE, 2013 Umicore, 2013-01-1300 $N_2O$ Emissions of Low Emission Vehicles).

Modern systems for preventing harmful exhaust gases in predominantly lean-operated combustion engines already often work with at least two nitrogen oxide storage catalysts, wherein one is positioned near the engine for faster heating and the other is installed in the colder underbody region (WO06069652A1; WO10034452A1; JP2009150282A2). For example, given such an arrangement, a greater temperature range may be covered by the activity windows of the nitrogen oxide storage catalysts.

It is known that nitrogen oxide storage catalysts produce $NH_3$ if they are charged with a rich exhaust gas mixture (SAE 2005-01-3876; DE102013218234). In systems comprising a nitrogen oxide storage catalyst (NSC, LNT, NSR) near the engine (cc) and a nitrogen oxide storage catalyst located in the underbody (uf), the danger results of an $N_2O$ production of uf-NSC due to oxidation of the $NH_3$ formed near the engine, since the regeneration of the cc-NSCs must be done with a rich air/fuel mixture range. The direct injection of the fuel into the combustion chamber of spark-ignition engines, and the turbo charger arranged in turn downstream of the outlet valve, result in a constant cooling of the exhaust gas temperature. These low temperatures are no longer sufficient for operating the underbody catalyst with adequate conversion efficiency, in particular for $N_2O$, especially in city driving and long-distance trips. In contrast, it is known that the $N_2O$ formation at a nitrogen oxide storage catalyst is particularly intensive in a defined temperature interval and given defined $\lambda$ values in predominantly lean-operating combustion engines (DE102013218234 as well as the literature cited therein). The cooler exhaust gas temperature at a nitrogen oxide storage catalyst arranged in the underbody region consequently produces an increased formation of the greenhouse gas $N_2O$ from the $NH_3$ formed during the regeneration at the nitrogen oxide storage catalyst located near the engine. In the process, the bed temperature of this underbody catalyst often moves continuously in an optimum nitrous oxide formation window of 220-400° C.

EP1536111B1 describes a method for the reduction of secondary emissions, such as methane or $N_2O$, in the exhaust gas of combustion engines that are fitted with NOx storage catalysts. In order to be able to reduce secondary emissions which, during the rich operation to regenerate the NOx storage catalyst, are formed via the latter, it is proposed that an additional catalyst be arranged downstream of the NOx storage catalyst. This catalyst is able to oxidize methane and $N_2O$ and consists of two different catalytically active materials. A palladium-containing catalyst is proposed for the oxidation of methane and an iron-zeolite catalyst is recommended for the reduction of $N_2O$. It is known that methane or $N_2O$ can be effectively converted in lean atmospheres via palladium-containing or iron-zeolite catalysts. However, the conversion of $N_2O$ in lean atmospheres via Pd catalysts is very small and the conversion via iron-zeolite catalysts only occurs at higher temperatures in excess of approx. 400° C. To ensure that the operation of the catalyst for $N_2O$ reduction is decidedly lean, which is certainly advisable for converting methane, EP1536111B1 additionally recommends a secondary air injection upstream of the catalyst positioned downstream. As described at the beginning, this does not, however, result in the desired $N_2O$ reduction at low temperatures.

DE102010014468A1 relates to a method for the aftertreatment of exhaust gas of essentially lean-burn combustion engines, as well as an appropriately advantageous exhaust gas aftertreatment system. In particular, this invention relates to the reduction of the proportion of the greenhouse gas $N_2O$ in the total exhaust gas of a corresponding combustion system having an NOx storage catalyst as an exhaust gas cleaning element. The objective of the invention is to operate the $N_2O$ reduction catalyst arranged downstream of the NOx storage catalyst under $\lambda \leq 1$ conditions as soon as the $N_2O$ formed by the NOx storage catalyst reaches the $N_2O$ reduction catalyst.

The object of the present invention is to achieve an improvement with regard to the balance of the $N_2O$ secondary emissions in an exhaust gas aftertreatment system which is comprised of a nitrogen oxide storage catalyst near the engine and a nitrogen oxide storage catalyst arranged at a defined distance therefrom. This should take place under the premise that other harmful exhaust gas components, or the fuel consumption, are not unduly negatively affected.

The object is achieved via a method according to claim 1. Preferred embodiments of the method according to the invention are the subject of discussion in the subclaims that are dependent on claim 1.

In that—for regeneration of an exhaust gas aftertreatment system for gasoline combustion engines that are predominantly operated lean, having one or more nitrogen oxide storage catalysts arranged near the engine and one or more nitrogen oxide storage catalysts located in the underbody of the vehicle—a complete emptying of these nitrogen oxide storage catalysts is not effected during the regeneration of the nitrogen oxide storage catalysts arranged near the engine, the posed object is achieved completely surprisingly but no less advantageously if the nitrogen oxide storage catalysts located in the underbody are within a temperature range in which ammonia is oxidized to form nitrous oxide. This type of temperature-controlled regulation strategy allows the automobile to be operated with approximately 40% less nitrous oxide emissions (measured in an FTP or NEDC cycle). Although the NOx emissions increase by nearly 10%, they may be better controlled via measures at the engine (for example corresponding AGR adjustment) than the just mentioned nitrous oxide emissions. In the overall picture, a significantly improved emission profile thereby results which enables compliance with both the strict US and future, stricter EU exhaust gas standards.

The present procedure in the regeneration of nitrogen oxide storage catalysts is accordingly advantageously used in a system that has at least one nitrogen oxide storage catalyst near the engine and at least one additional nitrogen oxide storage in the underbody region of the vehicle. Instead of a respective nitrogen oxide storage catalyst, multiple bricks may also be used. These bricks may be spaced apart from one another, or may preferably be accommodated edge to edge in a housing. The nitrogen oxide storage catalysts may be co-housed with corresponding probes for measurement of the exhaust gas conditions, selected from the group comprising NOx sensor, $\lambda$ sensor and temperature sensor. In a preferred embodiment, the exhaust gas aftertreatment system additionally has one or more three-way catalysts between the nitrogen oxide storage catalysts arranged near the engine and the engine (FIG. 1). The person skilled in the art knows how this complete system may be optimally designed so that it can advantageously interact in a vehicle with the ECU located there, and corresponding OBD measures may be successfully implemented. For example, in the complete system the additional, optional three-way catalyst has the task of oxidizing NO, HC and CO in lean operation as an oxidation catalyst with low light-off. If lambda=1, this functions according to a normal three-way catalyst and converts HC/CO/NOx with one another. In a rich exhaust gas mixture, this also acts as an HC-DeNOx catalyst which reduces NOx with the excess rich exhaust gas components (for example HCs, CO, etc.).

Figure 3:
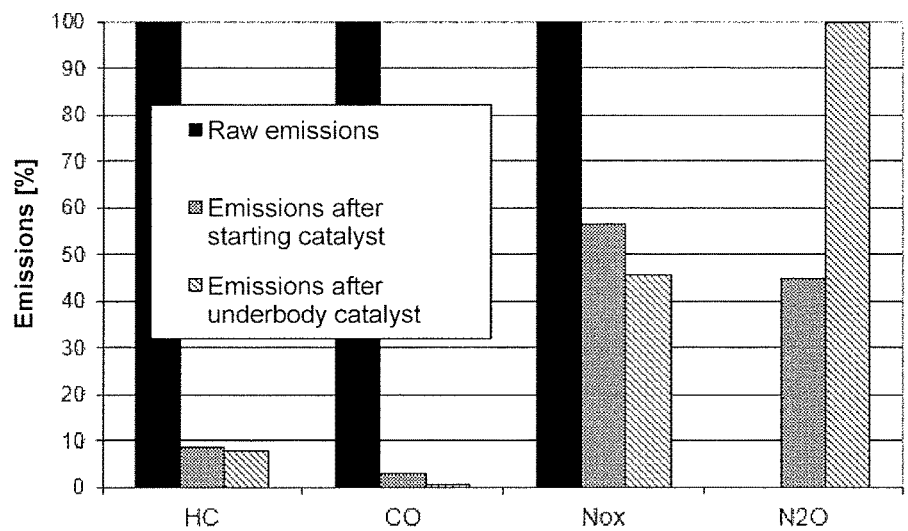
Figure 3:
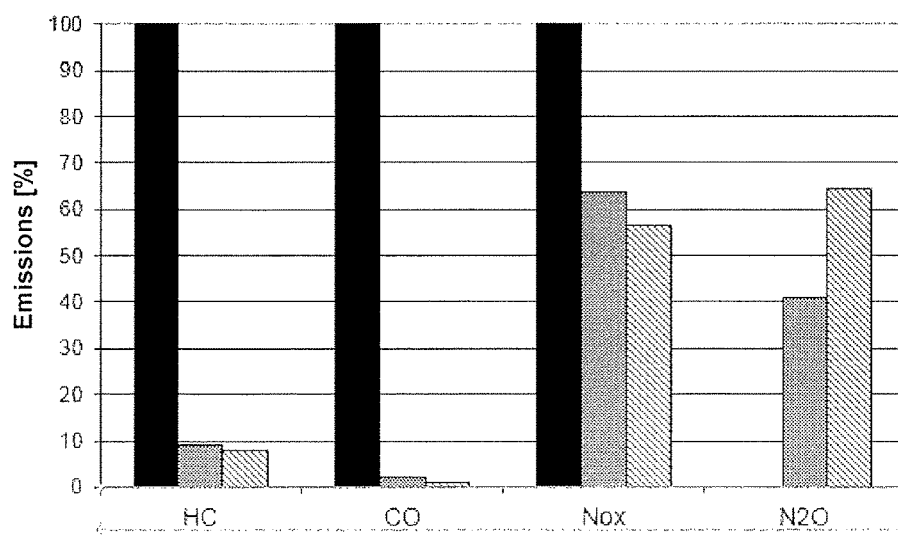

According to the invention, it is required that—during the regeneration of the nitrogen oxide storage catalyst(s) arranged near the engine—these are not completely regenerated in a defined temperature interval which prevails at this time at the nitrogen oxide storage catalyst(s) located in the underbody. It has been shown that, given a complete regeneration of nitrogen oxide storage catalysts, in addition to the rich breakthrough, which normally indicates the end of a regeneration cycle (so-called sensor-controlled method), regrettable quantities of ammonia also leave the nitrogen oxide storage catalyst. At defined exhaust gas temperatures in the nitrogen oxide storage catalyst located downstream, this ammonia is preferably oxidized to form nitrous oxide, which is then emitted unhindered into the environment. It is therefore preferred that the regeneration of the nitrogen oxide storage catalyst(s) near the engine is performed only in a proportion of 90%, more preferably 80% and especially preferably only in a proportion of 70% of the storage capacity that is present under the environmental conditions. This means that corresponding proportions of nitrogen oxides remain in the nitrogen oxide storage catalyst after the regeneration (so-called model-based method). This has the consequence that the rich breakthrough, and therefore the generation of ammonia can be almost entirely suppressed (FIG. 3). The latter in turn ensures that nitrous oxide is no longer formed in the underbody via the nitrogen oxide storage catalysts located there. It is to be noted that this measure leads to the situation that less rich exhaust gas reaches the nitrogen oxide storage catalyst located in the underbody. This may lead to a slight increase in the NOx emissions. It is also to be considered that this type of regeneration strategy requires that the nitrogen oxide storage catalyst near the engine must be regenerated more often since only a specific proportion of the nitrogen oxides that are located therein is regenerated per regeneration. However, at most this leads to a slight increase in the fuel consumption since, as a rule, only insignificantly more fuel needs to be used per regeneration. However, the regulation cost appears to be somewhat increased.

As was already indicated further above, the regulation strategy that is contemplated here particularly preferably takes place if the nitrogen oxide storage catalyst(s) located in the underbody are within a defined temperature window. This temperature window facilitates the formation of nitrous oxide from ammonia. It is therefore preferred that the regulation strategy according to the invention is only performed when the temperature of the nitrogen oxide storage catalysts in the underbody of the vehicle implements [sic] in a range from 220-400° C., preferably 225-380° C., and especially preferably at 230-350° C. A maximum suppression of the nitrous oxide formation at the nitrogen oxide storage catalyst located in the underbody is prevented by means of this measure (FIG. 4).

The temperature during the regeneration of the cc-nitrogen oxide storage catalyst with regard to stored nitrogen oxides may be selected by the person skilled in the art according to the present invention. It is preferred to perform the regeneration strategy according to the invention when the nitrogen oxide storage catalysts arranged near the engine is within a temperature interval between 150° C. and 500° C., particularly preferably between 200° C. and 450° C. With this embodiment, the regeneration strategy is best suited to suppress the nitrous oxide formation and therefore maximally suppress the emission of nitrous oxide into the environment.

The combustion air ratio sets the air mass $m_{L,tats}$ which is actually available for combustion in relation to the minimum required stoichiometric air mass $m_{L,st}$ which is required for complete combustion:

$$\lambda = m_{L,tats}/m_{L,st}$$

If $\lambda=1$, the ratio applies as a stoichiometric combustion air ratio with $m_{L,tats}=m_{L,st}$; this is the case if all fuel molecules can theoretically react fully with the atmospheric oxygen, without a lack of oxygen or without unburned oxygen being left over.

The following applies to combustion engines:
$\lambda<1$ (for example 0.9) means "lack of air": rich exhaust gas mixture
$\lambda>1$ (for example 1.1) means "surplus air": lean exhaust gas mixture Statement: $\lambda=1.1$ means that 10% more air is present than would be necessary for the stoichiometric reaction. This is at the same time designated as surplus air. However, an air-fuel mixture that corresponds to a lambda value of 0.8 to 1 is preferably maintained during the regeneration. This value is particularly preferably between 0.85 and 0.99, especially preferably between 0.95 and 0.99.

Insofar as underbody (uf) is discussed in the text, in connection with the present invention, this relates to a region in the vehicle in which the catalyst is installed at a distance of 0.2-2.5 m, more preferably 0.5-2 m and especially preferably 0.7-1.5 m after the end of the first catalyst near the engine, preferably below the driver cabin.

What is designated as near the engine (cc) within the scope of this invention is an arrangement of the catalyst at a distance of less than 70 cm, preferably less than 50 cm and especially preferably less than 30 cm from the exhaust gas outlet of the cylinder of the engine. The catalyst near the engine is preferably arranged directly after the merger of the exhaust gas manifold into the exhaust gas line.

The regulation of the method described herein may take place according to the measures known to the person skilled in the art. As described above, the most varied sensors that at any time measure the state of the exhaust gas with regard to specific components and transmit these values to the engine control unit (ECU) may be used to support the regulation and adjustment of the exhaust gas system. Due to cost considerations, however, an embodiment in which the regulation and adjustment of the exhaust gas system takes place partially or exclusively via data values (so-called maps) stored in the ECU seems to be particularly preferred. Sensors that are to be considered here are those that were already mentioned further above.

Vehicles operated with diesel engines or in particular lean-burning spark-ignition engines produce soot particles which are likewise regulated by corresponding laws. The emission of soot particles is especially to be limited, for example in light of the particulate load in inner cities. In light of this, it is advantageous to use particulate filters in exhaust gas systems of vehicles which are operated with such engines. The person skilled in the art knows how he is to position such particulate filters in corresponding exhaust gas systems. For example, the introduction of a diesel particulate filter in the forward region of the exhaust gas system, which naturally experiences more heat than is available to the exhaust gas system in the underbody of the vehicle, is suitable for diesel vehicles that produce a relatively cold exhaust gas. The high heat is particularly advantageous for a sufficient regeneration of the diesel particulate filter. In contrast, vehicles with lean-burning spark-ignition engines produce a relatively hot exhaust gas. Here, it is likewise conceivable to preferably arrange the particulate filter in the underbody of the vehicle. In doing so, the particulate filter can advantageously be installed upstream or downstream of the uf-nitrogen oxide storage catalyst. In a particularly preferred embodiment of the present invention, however, the particulate filter is combined with the nitrogen oxide storage catalyst such that the nitrogen oxide storage catalyst is present as a coating on the particulate filter. This embodiment is most preferable for vehicles with lean-burning spark-ignition engines.

NOx Storage Catalyst

NOx storage catalysts are comprised of materials that may remove nitrogen oxides from the exhaust gas flow under lean-operating exhaust gas conditions and may desorb and convert the nitrogen oxides under lambda=1 or rich exhaust gas conditions.

The nitrogen oxide storage catalysts that are to be used here are sufficiently known to the person skilled in the art (EP0982066A2, EP1317953A1, WO2005/092481A1). Furthermore, the statements in EP1911506A1 as well as EP1101528A2, and the literature cited therein, are referenced with regard to the design and composition of nitrogen oxide storage catalysts (NSC). The catalyst materials that are used are applied jointly or separately from one another, according to the methods known to the person skilled in the art, in the form of a coating onto monolithic, inert bodies made of ceramic (for example cordierite) or metal exhibiting 4- or 6-sided honeycombs.

The honeycomb bodies possess flow channels arranged in a narrow grid across their cross section, parallel to the longitudinal axis of the honeycomb bodies, for the exhaust gas to be cleaned. The catalytically active coating is deposited on or in the wall surfaces of the dividing walls bounding the flow channels, in concentrations from 50 to 450 grams per liter (g/L) of volume of the honeycomb bodies, preferably 200-400 g/L and especially preferably 250-350 g/L. The catalyst material includes the nitrogen oxide storage material and a catalytically active component. The nitrogen oxide storage material in turn consists of the actual nitrogen oxide storage component that is deposited in a highly dispersed form on a substrate material. The basic oxides of alkali metals, alkaline earth metals but in particular barium oxide and the rare earth metals, in particular cerium oxide, are predominantly used as storage components, which react with nitrogen dioxide to form the corresponding nitrates. Preferred storage materials are compounds containing Mg, Ba, Sr, La, Ce, Mn and K. The precious metals of the platinum group (for example Pt, Pd, Rh), which are normally deposited together with the storage component onto the substrate material, are conventionally used as catalytically active components. For the most part, active aluminum oxide with a large surface area is used as the carrier material.

TWC:

Three-way catalysts (TWC) are able to simultaneously remove the three pollutant components HC, CO and NOx from a stoichiometric exhaust gas mixture (λ=1 conditions). They may also convert the nitrogen oxides under rich exhaust gas conditions. They for the most part include platinum group metals—such as Pt, Pd and Rh, wherein Pd and Rh are particularly preferred—as catalytically active components. The catalytically active metals are often deposited with high dispersion on oxides of aluminum, zirconium and titanium or mixtures thereof, which have a large surface area and which may be stabilized by additional transition elements, such as La, Y, Pr, etc.

Three-way catalysts also include oxygen storage materials (for example Ce/Zr mixed oxides; see below). For example, a suitable three-way catalytic coating is described in EP181970B1, WO2008-113445A1, WO2008-000449A2 by the applicant, which are referenced here.

Oxygen Storage:

Oxygen-storing materials have redox properties and can react with oxidizing components, such as oxygen or nitrogen oxides in oxidizing atmosphere, or with reducing components, such as hydrogen or carbon monoxide, in reducing atmosphere. The embodiment of the exhaust gas aftertreatment of a combustion engine operating essentially in the stoichiometric range is described in EP1911506A1. In this case, a particulate filter provided with an oxygen storage material is used. Advantageously, such an oxygen-storing material consists of a cerium/zirconium mixed oxide. Additional oxides—of rare earth metals in particular—can be present. Preferred embodiments of the particulate filter according to the invention thus additionally include lanthanum oxide or neodymium oxide. Cerium oxide, which can be present as $Ce_2O_3$ as well as $CeO_2$, is used most frequently. In this regard, reference is also made to the disclosure of U.S. Pat. No. 6,605,264BB and U.S. Pat. No. 6,468,941BA.

Such oxygen-storing materials are preferably used in so-called three-way catalysts. Three-way catalysts include oxygen storage materials that mostly consist of cerium oxides and are possibly used with other metal oxides as thermally stable mixed phases (for example Ce/Zr mixed oxides). Additional examples of oxygen-storing materials comprise cerium and praseodymium or corresponding mixed oxides, which may include the additional following components selected from the group of zirconium, neodymium, yttrium, and lanthanum. These oxygen-storing materials are often doped with precious metals, such as Pd, Rh and/or Pt, whereby the storage capacity and storage characteristics can be modified. As stated, these substances are able to remove oxygen from the exhaust gas in lean operation and to release it again under rich exhaust gas conditions. This prevents the NOx conversion via the TWC from decreasing and NOx breakthroughs from occurring during a short-time deviation of the fuel-air ratio from lambda=1 into lean operation. Furthermore, a filled oxygen storage prevents HC and CO breakthroughs when the exhaust gas temporarily passes into the rich range since, under rich exhaust gas conditions, the stored oxygen reacts first with the excess HC and CO before a breakthrough occurs. In this case, the oxygen storage serves as a buffer against fluctuations around lambda=1. A half-filled oxygen storage exhibits the best performance in terms of being able to absorb short-term deviations from lambda=1. Lambda sensors are used in order to be able to determine the fill level of the oxygen storage during operation.

The oxygen-storage capacity correlates with the aging condition of the entire three-way catalyst. As part of the OBD (on board diagnosis), the determination of the storage capacity serves to identify the current activity—and therefore the aging condition—of the catalyst. The oxygen-storing materials that are described in the publications are advantageously those that permit a change to their oxidation state. Other such storage materials and three-way catalysts are described in WO05113126A1, U.S. Pat. No. 6,387, 338BA, U.S. Pat. No. 7,041,622BB, EP2042225A1, for example.

Substrates:

The nitrogen oxide storage catalysts may be arranged on a monolithic channel flow supporting body (flow-through) or a wall flow substrate (wall flow) or a particulate filter.

In the prior art, flow-through monoliths are typical catalyst substrates that may consist of metal or ceramic materials as in the case of the aforementioned filter materials. Fireproof ceramics, such as cordierite, are preferably used. The flow-through monoliths made of ceramic mostly have a honeycomb structure that consists of continuous channels, which is why flow-through monoliths are also referred to as channel flow monoliths. The exhaust gas can flow through the channels and, in doing so, comes into contact with the channel walls, which are coated with a catalytically active substance and possibly a storage material. The number of channels per area is characterized by the cell density, which typically ranges between 46.5 and 139.5 cells per square centimeter (between 300 and 900 cells per square inch (cpsi)). The wall thickness of the channel walls in ceramics is between 0.5-0.05 mm.

All filter bodies made of metal and/or ceramic materials that are typical in the prior art may be used as particulate filters. These include, for example, metallic fabric and knitted filter bodies, sintered metal bodies and foam structures made of ceramic materials. Porous wall-flow filter substrates made of cordierite, silicon carbide, or aluminum titanate are preferably used. These wall-flow filter substrates have inlet and outlet channels, wherein the respective downstream ends of the inlet channels and the upstream ends of the outlet channels are offset against each other and closed with gas-tight "plugs." In this case, the exhaust gas that is to be purified and which flows through the filter substrate is forced to pass through the porous wall between the inlet and outlet channels, which induces an excellent particulate filter effect. The filtration property for particulates can be designed by means of porosity, pore/radii distribution, and thickness of the wall. The catalyst material may be present in form of coatings in and/or on the porous walls between the inlet and outlet channels. Filters may also be used that have been extruded directly or with the aid of binders from the corresponding catalyst materials, meaning that the porous walls directly consist of the catalyst material, for example as can be the case in the case of SCR catalysts based on vanadium.

Preferably used filter substrates may be learned from EP1309775A1, EP2042225A1 or EP1663458A1.

Coating

The term "coating" refers to the application of catalytically active materials and/or storage components onto a largely inert supporting body, which may be designed like a previously described wall flow filter or flow-through monolith. The coating takes on the actual catalytic function and includes storage materials and/or catalytically active metals that are for the most part deposited in a highly dispersed form onto temperature-stable metal oxides with a large surface area. The coating for the most part takes place via the application of an aqueous suspension of the storage materials and catalytically active components—also called a washcoat—onto or into the wall of the inert supporting body. After the application of the suspension, the substrate is dried and if applicable calcined at increased temperature. The coating may consist of one layer or be made up of multiple layers that are applied atop one another (multi-layer) and/or offset relative to one another (zoned) onto a supporting body.

The intelligent regeneration strategy depicted here of nitrogen oxide storage catalysts arranged near the engine in a system consisting of precisely this and nitrogen oxide storage catalysts located in the underbody, allows the exhaust gases of predominantly lean-operated spark-ignition engines to be further reduced in a relatively simple but no less advantageous manner. In particular with regard to the polluting greenhouse gas $N_2O$ (nitrous oxide), the present invention offers the possibility of further reducing it without thereby significantly negatively affecting the other exhaust gas emissions. In light of the known prior art, this was by no means obvious.

FIGURES

FIG. 1—shows a schematic exhaust gas system with which the regeneration strategy according to the invention is preferably to be performed.

Figure 2:
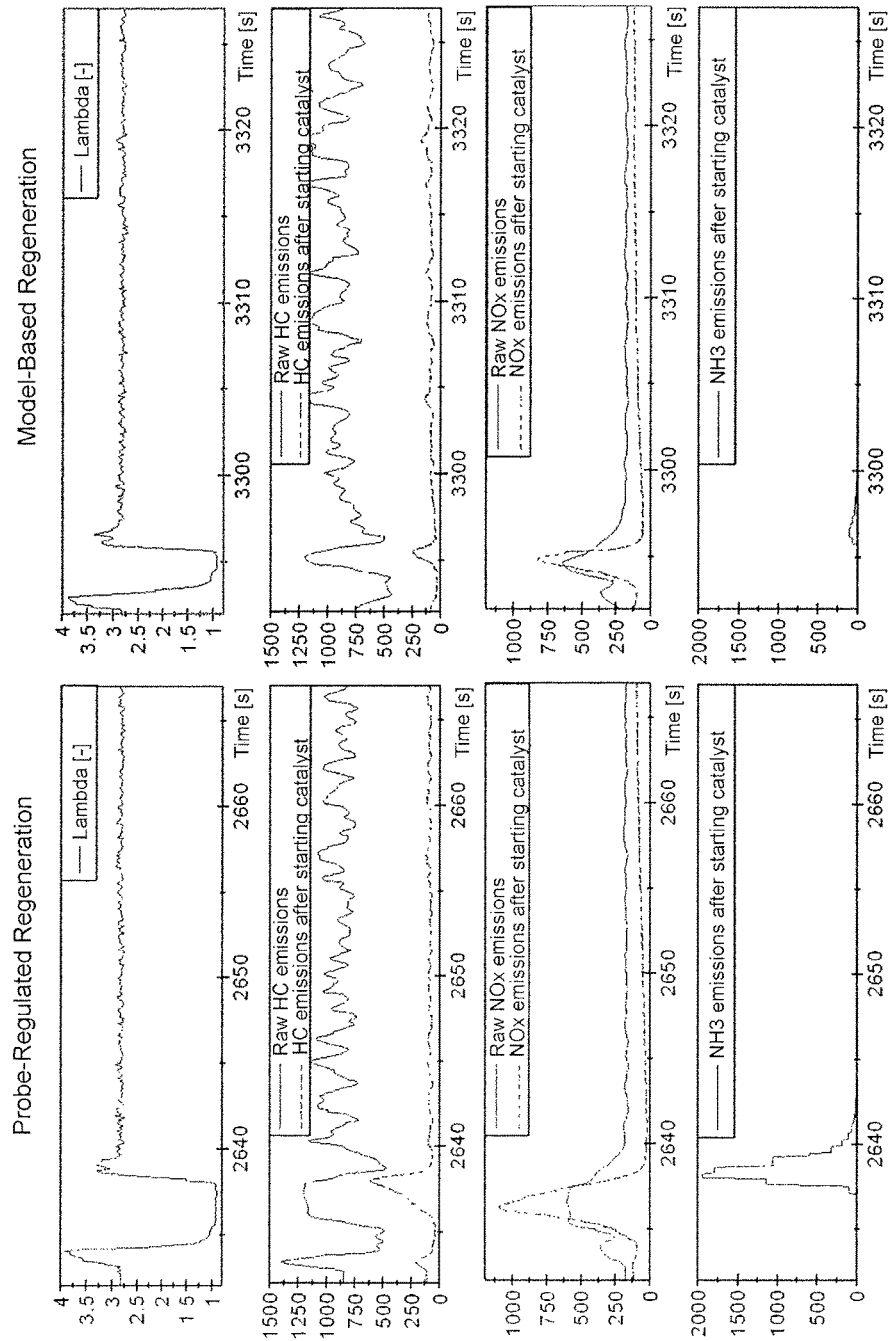

FIG. 2—regeneration comparison with lambda, HC, NOx, $NH_3$ formation

FIG. 3 suppression of $NH_3$ near the engine [depiction of tail pipe emissions in an NEDC driving cycle—comparison of complete regeneration vs. 90% regeneration]

REFERENCE SYMBOLS

FIG. 1
1 lean-burning spark-ignition engine
2 ECU
3 optional three-way catalyst near the engine
4 λ probe
5 nitrogen oxide storage catalyst near the engine (cc)
6 NOx sensor or λ probe
7 nitrogen oxide storage catalyst located in the underbody (uf)
8 NOx sensor or λ probe
9-11 temperature sensor

EXAMPLES

Two test runs were used for the test series for reducing the secondary emissions:

In a first step, a test run was created that enables a modeling of the $NH_3$ formation via the cc-NSC depending on temperature, lambda as well as rich operation duration. This test run is designated as modeling in the following. In a second step, a test run was implemented to verify the effectiveness of the model-based approach for reducing secondary emissions. This test run is designated as verification in the following.

Modeling

In principle, this test run is made up of stationary lean operation as well as probe-regulated rich operation phases at different temperature levels. A corresponding analysis enables the continuous measurement of all relevant emissions during the entire test run.

At the beginning, the engine is operated lean for a defined duration ($\lambda > 1$). Afterwards, a rich phase with defined setpoint lambda value is initiated, the duration of which is regulated by a discrete-level sensor downstream of the cc-NSC. As soon as this probe detects a rich breakthrough (typical voltage value >650 mV), the change back to lean operation takes place. This lean operation is followed by an additional rich phase with modified setpoint lambda value. The end of the rich phase is again detected by the discrete-level sensor. This process repeats until all setpoint lambda values have been tested. In the process, each setpoint lambda value is tested repeatedly to arrive at a statistical certainty.

After the lambda variation has concluded, the temperature is changed and all setpoint lambda values are tested again. This process repeats until all defined temperature levels have been tested.

Using all determined measurement data, a model is created that describes the $NH_3$ formation depending on temperature and lambda. In the following test run, this model is checked for its effectiveness in reducing the secondary emissions.

Verification

With the aid of the model, the rich phase is correspondingly shortened in the test run (see the description above) (FIG. 2; model-based regeneration). The result is a marked reduction in the secondary emissions ($N_2O$, $NH_3$; FIG. 2; FIG. 3). Transferred to the "New European Driving Cycle" NEDC, a marked reduction of the secondary emissions can also be determined here with only a slight increase in the NOx tail pipe emissions.

Engine Test Bench:

The test runs were conducted on a V6 spark-ignition motor with spray-guided, stratified combustion process. A commercially available exhaust gas catalyst (5) that has both oxidation and NOx storage function is located near the engine, at approximately 0.2-1.0 m distance from the engine outlet. For the purpose of analysis, raw exhaust gas is extracted upstream of this catalyst and the lambda signal is recorded via a broadband lambda probe (4). Likewise for the purpose of analysis, exhaust gas is extracted downstream of this catalyst, the lambda signal is recorded by means of broadband and discrete-level probe (6), and the quality of the regeneration via an NOx sensor (6) is checked. Ammonia ($NH_3$) is likewise measured here via a laser diode detector. An additional commercially available nitrogen oxide storage catalyst (7) is located at a distance of 1.0-2.0 meters from the engine outlet. For the purpose of analysis, exhaust gas is extracted again downstream of this catalyst and the lambda signal is recorded by means of a discrete-level probe (8).

The results of the probe-regulated and model-regulated regeneration are depicted in FIG. 2. The advantages of the regeneration strategy according to the invention are summarized in FIG. 3.

The invention claimed is:

1. A method for regeneration of an exhaust gas aftertreatment system for a predominantly lean-operated spark-ignition combustion engine comprises one or more nitrogen oxide storage catalysts arranged near the engine and one or more nitrogen oxide storage catalysts located in an underbody of a vehicle, comprising:
   determining a temperature of the one or more nitrogen oxide storage catalysts located in the underbody of the vehicle; and
   during a regeneration of the one or more nitrogen oxide storage catalysts arranged near the engine, if a temperature of the one or more nitrogen oxide storage catalysts located in the underbody is determined to be within a temperature range in which ammonia is oxidized to form nitrous oxide, suppressing a complete emptying of the one or more nitrogen oxide storage catalysts arranged near the engine.

2. The method according to claim 1, wherein
   the method is performed with an exhaust gas aftertreatment system that further rises one or more three-way catalysts positioned between the engine and the one or more nitrogen oxide storage catalysts arranged near the engine.

3. The method according to claim 1, further comprising
   ending the regeneration of the one or more nitrogen oxide storage catalysts arranged near the engine when the nitrogen oxide storage arranged near the engine is at most 90% emptied.

4. The method according to claim 3, wherein
   the regeneration of the one or more nitrogen oxide storage catalysts arranged near the engine is performed only when a temperature of the nitrogen oxide storage catalysts in the underbody of the vehicle is determined to be from 220-400° C.

5. The method according to claim 1, wherein
   the regeneration of the one or more nitrogen oxide storage catalysts arranged near the engine is performed only when a temperature of the nitrogen oxide storage catalysts in the underbody of the vehicle is determined to be from 220-400° C.

\* \* \* \* \*